United States Patent
Zinniel

(10) Patent No.: US 8,765,045 B2
(45) Date of Patent: Jul. 1, 2014

(54) SURFACE-TREATMENT METHOD FOR RAPID-MANUFACTURED THREE-DIMENSIONAL OBJECTS

(75) Inventor: Robert L. Zinniel, Plymouth, MN (US)

(73) Assignee: Stratasys, Inc., Eden Prairie, MN (US)

( * ) Notice: Subject to any disclaimer, the term of this patent is extended or adjusted under 35 U.S.C. 154(b) by 646 days.

(21) Appl. No.: 11/652,876

(22) Filed: Jan. 12, 2007

(65) Prior Publication Data

US 2008/0169585 A1 Jul. 17, 2008

(51) Int. Cl.
*B29C 71/00* (2006.01)
(52) U.S. Cl.
USPC .............................. 264/341; 264/82
(58) Field of Classification Search
CPC ...... B29C 71/0009; B29C 71/009; B24C 1/06
USPC .............................. 264/82, 83, 341
See application file for complete search history.

(56) References Cited

U.S. PATENT DOCUMENTS

| | | |
|---|---|---|
| 2,189,985 A | 2/1940 | Hickok |
| 2,651,811 A | 9/1953 | Coney |
| 3,020,661 A | 2/1962 | Miller et al. |
| 3,437,727 A | 4/1969 | Boyhan et al. |
| 3,737,499 A | 6/1973 | Kamena |
| 3,807,054 A | 4/1974 | Joseph et al. |
| 4,133,912 A * | 1/1979 | Stuart ............................ 264/83 |
| 4,260,873 A | 4/1981 | Simmons |
| 4,529,563 A | 7/1985 | McGinniss |
| 4,575,330 A | 3/1986 | Hull |
| 4,594,311 A | 6/1986 | Frisch et al. |
| 4,665,492 A | 5/1987 | Masters |
| 4,976,813 A | 12/1990 | Salensky et al. |
| 4,999,069 A | 3/1991 | Brackett et al. |
| 5,039,472 A | 8/1991 | Salensky et al. |
| 5,045,141 A | 9/1991 | Salensky et al. |
| 5,059,266 A | 10/1991 | Yamane et al. |
| 5,059,359 A | 10/1991 | Hull et al. |
| 5,073,231 A | 12/1991 | Eschwey et al. |
| 5,121,329 A | 6/1992 | Crump |
| 5,134,569 A | 7/1992 | Masters |
| 5,136,515 A | 8/1992 | Helinski |
| 5,143,663 A | 9/1992 | Leyden et al. |

(Continued)

FOREIGN PATENT DOCUMENTS

| | | |
|---|---|---|
| GB | 1314711 A | 4/1973 |
| JP | 50-026870 A | 3/1975 |

(Continued)

OTHER PUBLICATIONS

FAQ, Kramer Industries, http://www.kramerindustriesonline.com/finishing-guides/faq.htm accessed Jan. 23, 2010.*

(Continued)

*Primary Examiner* — Yogendra Gupta
*Assistant Examiner* — Alison Hindenlang
(74) *Attorney, Agent, or Firm* — Brian R. Morrison; Westman, Champlin & Koehler, P.A.

(57) ABSTRACT

A method for forming a surface-treated, three-dimensional object, comprising: solvent smoothing an exterior surface of a rapid-manufactured, three-dimensional object, and media blasting at least a portion of the solvent-smoothed exterior surface.

17 Claims, 2 Drawing Sheets
(1 of 2 Drawing Sheet(s) Filed in Color)

(56) References Cited

U.S. PATENT DOCUMENTS

| | | | |
|---|---|---|---|
| 5,204,055 A | 4/1993 | Sachs et al. | |
| 5,216,616 A | 6/1993 | Masters | |
| 5,257,657 A | 11/1993 | Gore | |
| 5,263,130 A | 11/1993 | Pomerantz et al. | |
| 5,340,433 A | 8/1994 | Crump | |
| 5,448,838 A | 9/1995 | Edmonds | |
| 5,503,785 A | 4/1996 | Crump et al. | |
| 5,587,913 A | 12/1996 | Abrams et al. | |
| 5,653,925 A | 8/1997 | Batchelder | |
| 5,695,707 A | 12/1997 | Almquist et al. | |
| 5,807,437 A | 9/1998 | Sachs et al. | |
| 5,866,058 A | 2/1999 | Batchelder et al. | |
| 5,939,008 A | 8/1999 | Comb et al. | |
| 5,943,235 A | 8/1999 | Earl et al. | |
| 5,945,016 A | 8/1999 | Cormack | |
| 5,976,339 A | 11/1999 | André, Sr. | |
| 5,986,234 A * | 11/1999 | Matthews et al. | 219/121.68 |
| 6,021,358 A | 2/2000 | Sachs | |
| 6,022,207 A | 2/2000 | Dahlin et al. | |
| 6,129,872 A | 10/2000 | Jang | |
| 6,133,355 A | 10/2000 | Leyden et al. | |
| 6,162,378 A | 12/2000 | Bedal et al. | |
| 6,165,406 A | 12/2000 | Jang et al. | |
| 6,175,422 B1 | 1/2001 | Penn et al. | |
| 6,193,923 B1 | 2/2001 | Leyden et al. | |
| 6,228,923 B1 | 5/2001 | Lombardi et al. | |
| 6,261,077 B1 | 7/2001 | Bishop et al. | |
| 6,324,438 B1 | 11/2001 | Cormier et al. | |
| 6,490,496 B1 | 12/2002 | Dacey | |
| 6,572,807 B1 | 6/2003 | Fong | |
| 6,600,965 B1 | 7/2003 | Hull et al. | |
| 6,645,412 B2 | 11/2003 | Priedeman, Jr. et al. | |
| 6,660,209 B2 | 12/2003 | Leyden et al. | |
| 6,722,872 B1 | 4/2004 | Swanson et al. | |
| 6,823,230 B1 | 11/2004 | Jamalabad et al. | |
| 6,907,307 B2 | 6/2005 | Chen et al. | |
| 7,077,638 B2 | 7/2006 | Leyden et al. | |
| 7,134,945 B2 | 11/2006 | Alexander | |
| 2003/0035917 A1 | 2/2003 | Hyman | |
| 2003/0090752 A1 | 5/2003 | Rosenberger et al. | |
| 2003/0127423 A1* | 7/2003 | Dlugokecki et al. | 216/14 |
| 2005/0103360 A1 | 5/2005 | Tafoya | |
| 2005/0173838 A1 | 8/2005 | Priedeman, Jr. et al. | |
| 2006/0001190 A1 | 1/2006 | Priedeman, Jr. et al. | |

FOREIGN PATENT DOCUMENTS

| | | | |
|---|---|---|---|
| JP | 2024122 A | 1/1990 | |
| JP | 6128398 | 5/1994 | |
| JP | 6128398 A | 5/1994 | |
| JP | 2001-219373 | 8/2001 | |
| JP | 2005-179604 | 7/2005 | |
| JP | 2005179604 A | 7/2005 | |
| JP | 2005523177 A | 8/2005 | |
| JP | 2001219373 | 8/2008 | |
| WO | 0067981 A1 | 11/2000 | |
| WO | PCT/US2005/036581 | 10/2005 | |

OTHER PUBLICATIONS

"CAD Meets Rapid Prototyping", by Terry Wohlers, *Computer-Aided Engineering*, vol. 11, No. 4, Apr. 1992.
International Search Report and Written Opinion of PCT/US2008/000430 filed Jan. 11, 2008.
Aug. 28, 2007 Preliminary Amendment for U.S. Appl. No. 10/511,784.
Jul. 28, 2008 Office Action for U.S. Appl. No. 10/511,784.
Jan. 28, 2009 Amendment for U.S. Appl. No. 10/511,784.
Mar. 27, 2009 Supplemental Amendment for U.S. Appl. No. 10/511,784.
Jun. 19, 2009 Office Action for U.S. Appl. No. 10/511,784.
Nov. 18, 2009 Amendment for U.S. Appl. No. 10/511,784.
Feb. 3, 2010 Office Action for U.S. Appl. No. 10/511,784.
May 3, 2010 Amendment for for U.S. Appl. No. 10/511,784.
Detrex Corporation Brochure for Model AQD The Modular Aqueous Cleaning System (4 pages), publically available at least as of 1996.
Detrex Corporation Brochure for Model CBW Multi-Stage Cabinetized Rotating Basket Washer (2 pages), publically available at least as of Feb. 7, 2002.
Detrex Corporation Brochure for MBW Industrial Washer Modular Conveyor Cleaning System (2 pages), Copyright 2000.
Detrex Corporation Brochure for MBW-MINI Compact Cleaning System (2 pages), publically available at least as of Feb. 7, 2002.
Detrex Corporation Brochure for MCS 2000 Cleaning System (2 pages), publically available at least as of Feb. 7, 2002.
Detrex Corporation Brochure for Model MLW Modular Lift Washer (2 pages), publically available at least as of Feb. 7, 2002.
Detrex Corporation Brochure for Model MR Series (2 pages), publically available at least as of Feb. 7, 2002.
Detrex Corporation Brochure for Model VI-2000, Detrex Electric or Steam Heated Two Dip Vapor/Immersion Degreaser (2 pages), publically available at least as of 1997.
Detrex Corporation Brochure for VIBRA Degreasers (2 pages), publically available at least as of Feb. 7, 2002.
Detrex Corporation Brochure for Model VS-2000, Detrex Electric or Steam Heated Vapor/Spray Degreaser (2 pages), publically available at least as of 1997.
Detrex Corporation Brochure for Clean Vap Recirculating Hot Water Parts Cleaning System (2 pages), publically available at least as of Feb. 7, 2002.
Detrex Corporation Brochure for Solvent Vapor Recovery Systems (2 pages), publically available at least as of Feb. 7, 2002.
Advisory Action dated May 24, 2010 from the United States Patent & Trademark Office for corresponding U.S. Appl. No. 10/511,784, filed Oct. 15, 2004.
Brief for Appellant electronically submitted to the United States Patent & Trademark Office on Aug. 3, 2010 for corresponding U.S. Appl. No. 10/511,784, filed Oct. 15, 2004.
Office Action from corresponding Chinese Patent Application No. 200880002057.8, dated Sep. 27, 2011.
Japanese Notice of Reason(s) for Rejection dated May 29, 2012 for Japanese Patent Application No. 2009-545611.
Chinese Notification of Grant of Invention Patent dated Jun. 6, 2012 for Chinese Patent Application No. 200880002057.8.

* cited by examiner

US 8,765,045 B2

SURFACE-TREATMENT METHOD FOR RAPID-MANUFACTURED THREE-DIMENSIONAL OBJECTS

BACKGROUND OF THE INVENTION

The present invention generally relates to the rapid manufacturing of three-dimensional (3D) objects such as prototypes, tooling, and production-quality parts. In particular, the present invention relates to a method of surface treating rapid-manufactured 3D objects.

The production and testing of 3D objects is commonly used for developing new products, machines, and processes in a wide range of industries. There are a variety of rapid manufacturing techniques for building 3D objects, each of which develop the objects from geometric computer models under computer control. These techniques generally slice or divide a digital representation of a desired object (e.g., a computer aided design (CAD)) into horizontal layers, then build the object layer-by-layer by repetitive application of materials. The term "rapid manufacturing" herein refers to the building of 3D objects by one or more layer-based additive techniques. Exemplary rapid manufacturing techniques include fused deposition modeling, ink jetting, selective laser sintering, and stereolithographic processes.

3D objects built by rapid manufacturing techniques generally exhibit "stair-step" appearances, particularly at curved or angled exterior surfaces. The stair stepping effect is caused by the layering of cross-sectional shapes that have square-edge profiles, and is more pronounced as layer thicknesses increase. While the stair stepping effect generally does not affect the strengths of the 3D objects, it may significantly diminish the desired aesthetic qualities. A variety of polishing techniques have been used to improve the surface finish of rapid-manufactured 3D objects. However, there is an ongoing need for surface treatment techniques that provide aesthetically pleasing surfaces to rapid-manufactured 3D objects.

BRIEF SUMMARY OF THE INVENTION

The present invention relates to a method for forming a surface-treated, 3D object. The method includes smoothing an exterior surface of a rapid-manufactured, 3D object with a solvent-based smoothing operation, and media blasting at least a portion of the solvent-smoothed exterior surface.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
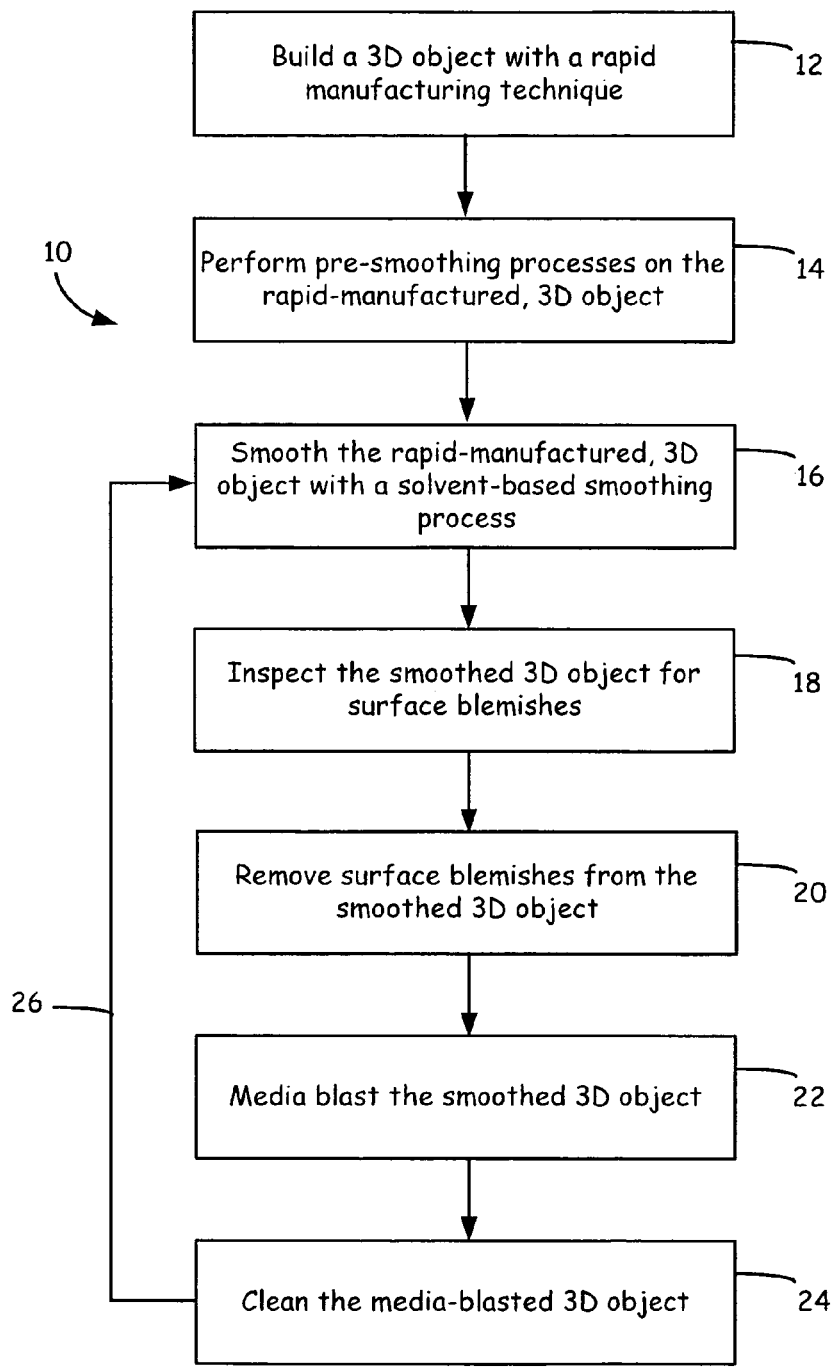
FIG. 1 is a flow diagram of a method for forming a surface-treated, 3D object.

FIG. 1 is a flow diagram of method 10 for forming a 3D object having a smooth, satiny exterior surface. Method 10 includes steps 12-24, and initially involves building at least a portion of the 3D object with a rapid manufacturing technique (step 12). Examples of suitable rapid manufacturing techniques for step 12 include layer-based additive techniques, such as fused deposition modeling, ink jetting, selective laser sintering, stereolithography, and combinations thereof. Preferably, the entire 3D object is built with the rapid manufacturing technique.

In one embodiment, the rapid manufacturing technique involves slicing a digital representation of the 3D object (e.g., an .STL file) into horizontal layers. Raster or vector paths may then be generated from the horizontal layers for building the 3D object, layer-by-layer, by repetitive application of build materials, pursuant to the rapid manufacturing technique used. The types of build materials used may depend on the particular rapid manufacturing system used to build the 3D object. The rapid manufacturing technique may also be performed in a single build process or with multiple build processes.

When rapid manufacturing techniques that involve deposition processes (e.g., fused deposition modeling and ink jetting) are used, overhanging portions or cavities of the 3D object may be supported by support structures. Support structures may be built utilizing the same rapid manufacturing techniques and systems by which the build material is deposited, and may be removed after the build process is complete. When the digital representation of the 3D object is sliced into horizontal layers, layers of support structures may also be generated and built, layer-by-layer, by repetitive application of a support material.

When the rapid manufacturing process is complete, one or more pre-smoothing processes may be performed on the rapid-manufactured, 3D object (step 14). Examples of suitable pre-smoothing processes include support structure removal, adhesion of multiple objects, the addition of a dye or colorant to an exterior surface of the 3D object (which may be swept into the near-surface material of the 3D object during the smoothing step), pre-cleaning steps, and combinations thereof.

The rapid-manufactured 3D object is then subjected to a solvent-based smoothing process (step 16), where at least a portion of the exterior surface of the 3D object is smoothed with the use of a solvent. As discussed above, after being built with a rapid manufacturing technique, the 3D object may exhibit a stair-step appearance due to the layering of cross-sectional shapes that have square-edge profiles. The solvent-based smoothing process smoothes at least a portion of the exterior surface of the 3D object, while substantially preserving the shape and fine features of the 3D object. This provides a smooth, glossy finish to the exterior surface of the 3D object that reduces or eliminates the stair-step appearance.

The smoothing process initially involves supporting the 3D object from a mount that desirably minimizes contact with the exterior surface of the 3D object. Contact points between the exterior surface of the 3D object and foreign components typically form blemishes in the exterior surface during the smoothing process. Thus, reducing the contact area on the exterior surface of the 3D object correspondingly reduces intensities of resulting blemishes.

Suitable techniques for supporting the 3D object within the smoothing system are disclosed in Priedeman, Jr. et al., U.S. Publication No. 2005/0173838. Additionally, a particularly suitable technique for supporting the 3D object involves suspending the 3D object from a single hook-like member, which balances the suspended 3D object, and which provides a single contact point between the hook-like member and the exterior surface of the 3D object. Alternatively, for complex 3D objects, multiple hook-like members may be used to suspend the 3D object in a sling-like manner.

A particularly suitable solvent-based smoothing process for step 16 involves vapor smoothing the rapid-manufactured, 3D object with a vapor smoothing system. The vapor smoothing system contains a solvent vapor that smoothes exposed exterior surfaces regions of the 3D object, thereby reducing or eliminating the stair-stepping effects. The solvent used for the vapor smoothing is desirably selected to be compatible with the build material used to form the 3D object. Examples of suitable solvents for vapor smoothing include methylene chloride, n-propyl bromide, perchloroethylene, trichloroethylene, acetone, methyl ethyl ketone, dimethylacetamide, xylene, toluene, water, alcohols, and combinations thereof.

An example of a suitable vapor smoothing system for use in step 16 is disclosed in Priedeman et al., U.S. Patent Application No. 2005/0173838. The vapor smoothing system desirably operates by exposing the 3D object to solvent vapor within an enclosed chamber. The chamber may be maintained at or above the boiling point temperature of the solvent. While the solvent is in a vapor state, it does not affect the 3D object. However, because the 3D object is initially at a temperature substantially below the boiling temperature of the solvent (e.g., room temperature), the solvent condenses on the exterior surface of the 3D object. The condensed solvent penetrates the exposed exterior surface of the 3D object, thereby dissolving the material at the exposed exterior surface. This causes the material to reflow and disperse over a wider area of the exterior surface. When the 3D object heats up to the chamber temperature, the condensed solvent revaporizes. The dispersed material then remains in the newly dispersed locations, which results in a substantially smooth surface having a glossy finish.

Vapor smoothing is dependent on several interacting factors, such as the exposure time that the 3D object is subjected to the condensed solvent, the type and concentration of solvent used, the build material used for the 3D object, the exterior surface area of the 3D object, and the fineness of the 3D object features. As such, the duration of the vapor smoothing process may vary. Examples of suitable durations for the vapor smoothing process range from about ten seconds to about five minutes, with particularly suitable durations ranging from about thirty seconds to about one minute.

In one embodiment, the 3D object may be cooled (e.g., below room temperature) prior to the vapor smoothing process. This increases the temperature differential between the solvent vapor and the 3D object, which increases the solvent-condensation rate during the vapor smoothing process. This embodiment is particularly suitable for use with solvents that have low boiling temperatures (e.g., methylene chloride), and increases the repeatability of the vapor smoothing process. For example, methylene chloride, which has a boiling temperature of about 40° C. (104° F.) provides different vapor smoothing results for a 3D object maintained at an ambient temperature of 16° C. (60° F.) compared to an ambient temperature of 27° C. (80° F.). As such, cooling the 3D object to a lower temperature (e.g., between 0° C. (32° F.) to 4° C. (40° F.)) increases the consistency and predictability of the vapor smoothing results.

The vapor smoothing process may also be performed in multiple, successive vapor smoothing steps. For example, after an initial vapor smoothing process, the 3D object may be inspected to determine the extent of the smoothing. If additional smoothing is needed, the partially-smoothed 3D object may then be subjected to one or more additional vapor smoothing processes. When the vapor smoothing process is complete, the smoothed 3D object may then be cooled and dried.

In alternative embodiments for step 16, the solvent-based smoothing process may involve dipping or submersing the rapid-manufactured, 3D object into a bath containing a liquid solvent, or spraying the rapid-manufactured, 3D object with a liquid solvent. Examples of suitable solvents include those discussed above for the vapor smoothing process, and the solvent used is desirably selected to be compatible with the build material used to form the 3D object. The liquid solvent penetrates the exposed exterior surface of the 3D object, thereby dissolving the material at the exposed exterior surface. This causes the material to reflow and disperse over a wider area of the exterior surface. The 3D object is desirably exposed to the liquid solvent for a sufficient duration to provide a smooth, glossy finish on at least a portion of the exterior surface. The 3D object is then dried (e.g., air dried) to evaporate the solvent off from the smoothed exterior surface, thereby preventing further solvent-based smoothing.

In one embodiment, the specular reflectivity of the exterior surface of the 3D object is monitored during the solvent-based smoothing process. The specular reflectivity of a surface refers to the mirror-like reflectivity of the surface, where light rays from a single incoming direction are reflected into a single outgoing direction. Prior to the solvent-based smoothing process, the exterior surface of the 3D object is rough, thereby exhibiting a diffuse reflectivity, where light rays from a single incoming direction are reflected into a broad range of outgoing directions. The smoothing process, however, increases the glossiness of the exterior surface, thereby increasing the specular reflectivity of the exterior surface.

The specular reflectivity of the exterior surface may be monitored with a variety of specular reflectivity monitoring systems that monitor the specular reflectivity between cycles of the smoothing process. Alternatively, for smoothing systems that do not inhibit real-time monitoring (e.g., vapor smoothing systems), the monitoring may occur during the smoothing process. In one embodiment, the specular reflectivity is monitored at one or more exterior surface locations of the 3D object. Alternatively, or in addition, the uniformity of specular reflectivity may be monitored across the 3D object. When the specular reflectivity of the exterior surface reaches a predetermined level for the smoothing process, the smoothing process may be discontinued and the smoothed 3D object is dried.

The above-discussed, solvent-based smoothing processes provide a smooth, glossy finish to the exterior surface of the 3D object. Additionally, the solvent-based smoothing processes also reduce the porosity of the 3D object at the exterior surface. During the building process of step 12 of method 10, small porous regions may form in the layers of the 3D object, which can be detrimental to the physical properties of the 3D object. However, the dissolving and reflow of the surface materials during the solvent-based smoothing operation reduce the porosity of the 3D object at the exterior surface. This correspondingly increases the structural integrity and sealing properties of the 3D object.

In contrast, alternative smoothing techniques, such as sanding and direct media blasting do not provide glossy finishes and do not reduce the porosity of the 3D object. Additionally, smoothing techniques such as manual or power sanding are time consuming, and can remove too much material if not constantly monitored (e.g., sanding through the perimeter layer to expose the internal raster pattern). Direct media blasting with cutting media (e.g., aluminum oxide and glass beads) can provide rapid surface smoothing. However, the blasting duration required to remove the stair-step appearance from the exterior surface can also remove the perimeter layers of the 3D object and destroy fine features. Additionally, unlike solvent-based smoothing processes, sanding and direct media blasting are not suitable for accessing internal features of the 3D object (e.g., cavities), and incomplete and directional smoothing may create surface finishes that are not aesthetically pleasing.

After the smoothing process is complete, the smoothed 3D object may then be inspected for surface blemishes (step 18). The smooth, glossy exterior surface may incur one or more surface blemishes from a variety of sources. For example, contact between the 3D object and the smoothing mount may cause a portion of the mount to melt into the surface of the 3D object during the smoothing process. Unfortunately, the glossy finish of the exterior surface highlights such surfaces blemishes, causing the blemishes to be readily observable to the naked eye. This detracts from the aesthetic qualities of the smoothed 3D object.

If one or more surface blemishes are found on the 3D object, the blemishes may then be removed by rubbing an abrasive material (e.g., a file and sandpaper) over the blemish for a sufficient duration to remove the blemish (step 20). However, the blemish removal process also reduces the glossy finish of the exterior surface at the locations where the blemishes were removed. These reduced-glossy areas are also readily observable as dull, non-glossy surface areas. This also detracts from the aesthetic qualities of the smoothed 3D object.

To improve the aesthetic qualities of the smoothed 3D object, the smoothed 3D object is placed in a media blasting system and media blasted to remove the glossy finish from the exterior surface (step 22). This forms a burnished exterior surface that has a smooth, satiny finish, rather than a glossy finish. A variety of different types and sizes of blasting media may be used to vary the texturization of the exterior surface of the 3D object. Examples of suitable blasting media include salts (e.g., sodium bicarbonate and sodium chloride), walnut shells, dry ice, nanoparticles, commercially available burnishing media, and combinations thereof. In one embodiment, the blasting media is a high-purity blasting media (e.g., dry ice and high-purity sodium bicarbonate), which results in a clean 3D object. Examples of suitable media blasting systems include those disclosed in Alexander, U.S. Pat. No. 7,134,945.

The duration and the intensity of the media blasting may vary depending on the desired texture of the exterior surface, and on the blasting media used (e.g., different materials and particle sizes). However, because the stair-step appearance is previously removed in the solvent-based smoothing operation, the duration and intensity of the media blasting process is desirably limited to the substantial removal of the glossy finish from the exterior surface. For example, each region of the exterior surface may be media blasted for a few seconds to remove the glossy finish at the given regions. This reduces the risk of removing the perimeter layers of the 3D object and destroying fine features.

The media blasting process may also be performed in multiple, successive blasting steps. For example, after an initial media blasting process, the 3D object may be inspected to determine the extent of the blasting. If additional media blasting is needed, the 3D object may then be subjected to one or more additional media blasting processes.

In one embodiment, the specular reflectivity of the exterior surface of the smoothed 3D object is monitored during the media blasting process. As discussed above, after the solvent-based smoothing process, the exterior surface of the 3D object is glossy, thereby exhibiting a high specular reflectivity (except at the surface blemishes). The media blasting process, however, reduces the glossiness of the exterior surface thereby reducing the specular reflectivity (i.e., increasing the diffuse reflectivity). The specular reflectivity of the exterior surface may be monitored with a variety of specular reflectivity monitoring systems that monitor the specular reflectivity between cycles of the media blasting process. In one embodiment, the specular reflectivity is monitored at one or more exterior surface locations of the 3D object. Alternatively, or in addition, the uniformity of specular reflectivity may be monitored across the 3D object. When the specular reflectivity of the exterior surface reaches a predetermined level for the media blasting process, the media blasting process may then be discontinued.

In alternative embodiments, one or both of steps 18 and 20 of method 10 are omitted. The media blasting process of step 22 is also suitable for removing minor surface blemishes formed during the solvent-based smoothing process of step 16. This provides a smooth, satiny exterior surface that is substantially free of observable surface blemishes, while also reducing the time required to surface treat the 3D object.

When the media blasting process is complete, the smoothed 3D object may then be cleaned (e.g., washed) to remove any residual particles from the media blasting (step 24). The resulting 3D object has an exterior surface that exhibits a smooth, satiny finish that is aesthetically pleasing. In addition, the exterior surface has a reduced porosity similar to that of solvent-smoothed surfaces. However, in contrast to the glossy finish of solvent-smoothed surfaces, the satiny finish obtained by method 10 reduces or eliminates observable surface blemishes obtained during the solvent-based smoothing process and of any blemish removal locations.

If the exterior surface of the resulting 3D object does not exhibit the desired aesthetic qualities, steps 16-24 may be repeated one or more times (as represented by arrow 26). Thus, the 3D object may undergo multiple solvent-based smoothing and media blasting processes until the desired aesthetic qualities are obtained. This increases the flexibility of method 10 to meet individual needs.

EXAMPLE

The present invention is more particularly described in the following example, which is intended as an illustration only, since numerous modifications and variations within the scope of the present invention will be apparent to those skilled in the art. A surface-treated, 3D object, which exhibited a smooth, satiny exterior surface, was prepared pursuant to the following procedure. The 3D object was initially built in a layer-by-layer manner with white-colored, acrylonitrile-butadiene-styrene (ABS) polymer, in a fused deposition modeling system commercially available under the trade designation "FDM TITAN" from Statasys, Inc., Eden Prairie, Minn. (pursuant to step 12 of method 10). The 3D object was then removed from the fused deposition modeling system and allowed to cool to room temperature. In this example, pre-smoothing processes under step 14 of method 10 were not performed (e.g. support material removal was not required).

The 3D object was then suspended by a wire member, which extended through an eyelet of the 3D object for insertion into a vapor smoothing system. The vapor smoothing system was configured as described in Priedeman, Jr. et al., U.S. Publication No. 2005/0173838, and included a vapor chamber of n-propyl bromide maintained at 70° C. (i.e., the boiling point of the solvent). The suspended 3D object was inserted into the vapor smoothing system for two 30-second cycles, and then dried and cooled to room temperature (pursuant to step 16 of method 10). The wire member was then removed from the eyelet of the 3D object, and the 3D object was inspected for surface blemishes (pursuant to step 18 of method 10).

Figure 2:
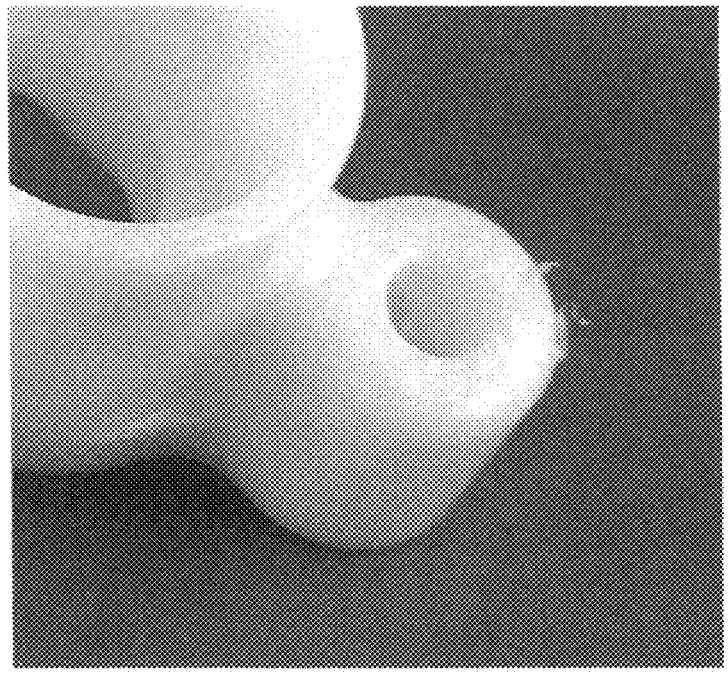
FIG. 2 is a photograph of a 3D object after being subjected to a vapor smoothing process, where the 3D object has a smooth, glossy exterior surface, and contains an observable surface blemish.

FIG. 2 is a photograph of the 3D object after being subjected to the vapor smoothing process. As shown, the 3D object contained a smooth, glossy exterior surface that substantially removed any stair-step appearance. The glossy finish is visible in FIG. 2 by the light reflections at various locations along the exterior surface of the 3D object. However, as further shown, the eyelet of the 3D object also contained a surface blemish in the plastic material. During the vapor smoothing process, the reflow of the surface plastic material caused portions of the plastic material to flow over the wire member. The subsequent removal of the wire member then formed the blemish in the exterior surface of the 3D object at eyelet 26, which was readily observable to the naked eye and detracted from the aesthetic quality of the 3D object.

The surface blemish was removed with an abrasive file (pursuant to step 20 of method 10). While this improved the aesthetic quality of the 3D object with respect to the surface blemish, the blemish removal also eliminated the glossy finish of the exterior surface at the location of the blemish. While not shown in FIG. 2, this loss of the glossy finish was also readily observable to the naked eye in contrast to the rest of the exterior surface (which retained the glossy finish). This also detracted from the aesthetic quality of the 3D object.

The 3D object was then placed in a standard venturi-type soda blaster. The operating pressure was then set to 276 kilopascals (40 pounds/inch$^2$), and the 3D object was blasted with a baking soda (i.e., sodium bicarbonate) powder for 120 seconds (pursuant to step 22 of method 10). This allowed the baking soda to blast each region of the exterior surface of the 3D object for a few seconds. After the soda blasting process, the resulting 3D object was then washed with water to remove the residual baking soda particles (pursuant to step 24 of method 10).

Figure 3:
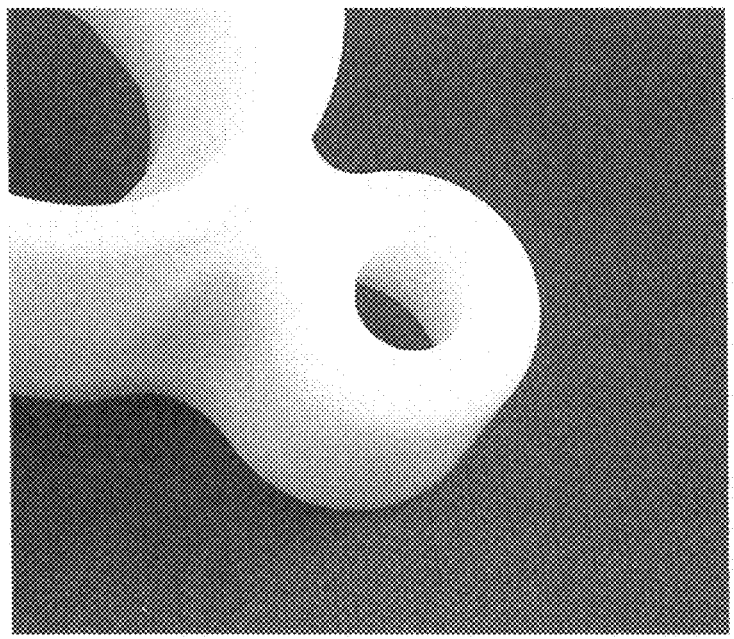
FIG. 3 is a photograph of the 3D object after being subjected to a media blasting process, where the 3D object has a smooth, satiny exterior surface, where the surface blemish is no longer observable.

FIG. 3 is a photograph of the 3D object after being subjected to the soda blasting process. As shown, the 3D object contained a smooth, satiny exterior surface that exhibited a specularly-diffusive appearance and a pleasant wax-like feel to the touch. Moreover, because the glossy finish was removed, the blemish removal site located at the eyelet was no longer readily observable to the naked eye. Accordingly, the resulting 3D object exhibit an aesthetically pleasing exterior surface.

Although the present invention has been described with reference to preferred embodiments, workers skilled in the art will recognize that changes may be made in form and detail without departing from the spirit and scope of the invention.

The invention claimed is:

1. A method for forming a surface-treated, three-dimensional object, the method comprising:
    placing a rapid-manufactured, three-dimensional object in a vapor smoothing chamber, the rapid-manufactured, three-dimensional object compositionally comprising a thermoplastic material, and having an exterior surface that includes surface effects due to a layer-by-layer, rapid manufacturing technique;
    vapor smoothing the exterior surface of the rapid-manufactured, three-dimensional object with a solvent vapor in the vapor smoothing chamber to reduce or eliminate the surface effects;
    monitoring a specular diffusivity of the exterior surface;
    discontinuing the vapor smoothing step when the specular diffusivity of the exterior surface reaches a first predetermined level, wherein the resulting smoothed three-dimensional object has a solvent-smoothed exterior surface with a higher glossiness than the exterior surface prior to the vapor smoothing step;
    media blasting at least a portion of the solvent-smoothed exterior surface to provide a burnished exterior surface;
    monitoring a specular diffusivity of the solvent-smoothed exterior surface; and
    discontinuing the media blasting when the specular diffusivity of the solvent-smoothed exterior surface reaches a second predetermined level, wherein the burnished exterior surface has a lower glossiness than the solvent-smoothed exterior surface prior to the media blasting step.

2. The method of claim 1, wherein the vapor smoothing step reduces a porosity of the three-dimensional object at the exterior surface.

3. The method of claim 1, wherein the solvent vapor uses a solvent selected from the group consisting of methylene chloride, n-propyl bromide, perchloroethylene, trichloroethylene, acetone, methyl ethyl ketone, dimethylacetamide, xylene, toluene, water, alcohols, and combinations thereof.

4. The method of claim 1, further comprising cooling the rapid-manufactured, three-dimensional object below room temperature prior to smoothing the exterior surface.

5. The method of claim 1, wherein placing the rapid-manufactured, three-dimensional objet in the vapor smoothing chamber comprises suspending the rapid-manufactured, three-dimensional object from a hook-like member in the vapor smoothing chamber.

6. The method of claim 1, further comprising abrasively removing at least one surface blemish from the solvent-smoothed exterior surface.

7. The method of claim 1, wherein the media blasting comprises blasting with sodium bicarbonate.

8. A method for forming a surface-treated, three-dimensional object, the method comprising:
    building at least a portion of a three-dimensional object from a thermoplastic material with a layer-by-layer, rapid manufacturing technique, the three-dimensional object having an exterior surface that includes surface effects due to the layer-by-layer, rapid manufacturing technique;
    placing the built three-dimensional object in a vapor smoothing chamber;
    vapor smoothing the exterior surface with a solvent-based vapor smoothing process in the vapor smoothing chamber to reduce or eliminate the surface effects;
    monitoring a specular diffusivity of the exterior surface;
    discontinuing the vapor smoothing process when the specular diffusivity of the exterior surface reaches a first predetermined level, wherein the resulting smoothed three-dimensional object has a solvent-smoothed exterior surface with a higher glossiness than the exterior surface prior to the vapor smoothing step;
    placing the smoothed three-dimensional object in a media blasting system;
    media blasting at least a portion of the solvent-smoothed exterior surface while the smoothed three-dimensional object is disposed in the media blasting system;
    monitoring a specular diffusivity of the solvent-smoothed exterior surface; and
    discontinuing the media blasting when the specular diffusivity of the smoothed exterior surface reaches a second predetermined level, wherein the burnished exterior surface has a lower glossiness than the solvent-smoothed exterior surface prior to the media blasting step.

9. The method of claim 8, wherein the vapor smoothing step reduces a porosity of the three-dimensional object at the exterior surface.

10. The method of claim 8, further comprising cooling the built three-dimensional object below room temperature prior to vapor smoothing the exterior surface.

11. The method of claim 8, wherein the media blasting comprises blasting with sodium bicarbonate.

12. A method for forming a surface-treated, three-dimensional object, the method comprising:
provKiding a three-dimensional object at least partially built with a layer-by-layer, rapid manufacturing technique using a thermoplastic material, the three-dimensional object having an exterior surface that includes surface effects due to the layer-by-layer, rapid manufacturing technique;
placing the three-dimensional object in a vapor smoothing chamber;
reducing or eliminating the surface effects of the exterior surface with a solvent-based, vapor smoothing process in the vapor smoothing chamber to provide a solvent-smoothed exterior surface having a higher glossiness than the exterior surface prior to the solvent-based, vapor smoothing process;
monitoring a specular diffusivity of the exterior surface during the solvent-based, vapor smoothing process;
discontinuing the vapor smoothing process when the specular diffusivity of the exterior surface reaches a first predetermined level, wherein the resulting smoothed three-dimensional object has a solvent-smoothed exterior surface with a higher glossiness than the exterior surface prior to the vapor smoothing step;
media blasting at least a portion of the solvent-smoothed exterior surface;
monitoring a specular diffusivity of the solvent-smoothed exterior surface during the media blasting step; and
discontinuing the media blasting when the specular diffusivity of the solvent-smoothed exterior surface reaches a second predetermined level, wherein the burnished exterior surface has a lower glossiness than the solvent-smoothed exterior surface prior to the media blasting step.

13. The method of claim 12, wherein the solvent-based vapor smoothing process uses a solvent selected from the group consisting of methylene chloride, n-propyl bromide, perchloroethylene, trichloroethylene, acetone, methyl ethyl ketone, dimethylacetamide, xylene, toluene, water, alcohols, and combinations thereof.

14. The method of claim 12, further comprising cooling the rapid-manufactured, three-dimensional object below room temperature prior to the vapor smoothing process.

15. The method of claim 12, wherein the media blasting comprises blasting with sodium bicarbonate.

16. The method of claim 12, wherein providing the three-dimensional object that is at least partially built with the rapid manufacturing technique comprises building the three-dimensional object in a layer-by-layer manner using the rapid manufacturing technique.

17. The method of claim 12, wherein the surface effects of the exterior surface comprise stair-step effects.

* * * * *

UNITED STATES PATENT AND TRADEMARK OFFICE
CERTIFICATE OF CORRECTION

PATENT NO.          : 8,765,045 B2                           Page 1 of 1
APPLICATION NO.     : 11/652876
DATED               : July 1, 2014
INVENTOR(S)         : Robert L. Zinniel It is certified that error appears in the above-identified patent and that said Letters Patent is hereby corrected as shown below:

On the Title Page

Item (56) Foreign Patent Documents, page 2, JP 2001219373, delete "8/2008" and insert -- 8/2001 --.

In the Claims

Claim 5, Column 8, Line 29, delete "objet" and insert -- object --.

Signed and Sealed this
Twelfth Day of May, 2015

Michelle K. Lee
*Director of the United States Patent and Trademark Office*